(12) United States Patent
Ahuja et al.

(10) Patent No.: US 10,747,859 B2
(45) Date of Patent: Aug. 18, 2020

(54) SYSTEM, METHOD AND COMPUTER PROGRAM PRODUCT FOR STATEFUL INSTRUCTION-BASED DYNAMIC MAN-MACHINE INTERACTIONS FOR HUMANNESS VALIDATION

(71) Applicant: International Business Machines Corporation, Armonk, NY (US)

(72) Inventors: Karan Ahuja, New Delhi (IN); Kuntal Dey, New Delhi (IN); Utkarsh Dwivedi, New Delhi (IN); Seema Nagar, Bangalore (IN); Roman Vaculin, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 226 days.

(21) Appl. No.: 15/400,458

(22) Filed: Jan. 6, 2017

(65) Prior Publication Data
US 2018/0196930 A1    Jul. 12, 2018

(51) Int. Cl.
*G06F 21/31* (2013.01)
*H04L 29/06* (2006.01)
*G06F 21/32* (2013.01)

(52) U.S. Cl.
CPC ............ *G06F 21/316* (2013.01); *G06F 21/32* (2013.01); *H04L 63/0861* (2013.01); *G06F 2221/2133* (2013.01)

(58) Field of Classification Search
CPC ......... G06F 21/30; G06F 21/32; H04L 9/0866
USPC .................................................. 713/150–155
See application file for complete search history.

(56) References Cited

U.S. PATENT DOCUMENTS

| 8,925,057 | B1* | 12/2014 | Ansari ............... G06F 21/31 382/181 |
| 9,547,763 | B1* | 1/2017 | Avital .................. G06F 21/36 |
| 9,607,138 | B1* | 3/2017 | Baldwin .............. G06F 21/32 |
| 9,729,865 | B1* | 8/2017 | Kuo .................. G06K 9/00268 |
| 9,759,934 | B2* | 9/2017 | Divo .................. G02C 13/005 |
| 10,025,060 | B2* | 7/2018 | Lanman ............... G02B 7/287 |
| 10,027,883 | B1* | 7/2018 | Kuo .................. G06K 9/00295 |
| 10,237,304 | B1* | 3/2019 | Sokolov ........... G06F 16/24575 |
| 2007/0283142 | A1* | 12/2007 | Milstein ................ H04L 63/08 713/155 |
| 2013/0044055 | A1* | 2/2013 | Karmarkar .............. G06F 3/013 345/158 |
| 2014/0032723 | A1* | 1/2014 | Nema ................... G06Q 10/00 709/220 |

(Continued)

OTHER PUBLICATIONS

Mel, et al. "The NIST Definition of Cloud Computing". Recommendations of the National Institute of Standards and Technology. Nov. 16, 2015.

*Primary Examiner* — Lynn D Feild
*Assistant Examiner* — Viral S Lakhia
(74) *Attorney, Agent, or Firm* — Anthony R. Curro, Esq.; McGinn IP Law Group, PLLC (57) ABSTRACT

A humanness validation method, system, and computer program product, include generating a sequence of actions including gaze actions and emotional state actions, instructing an access requestor to perform the actions in the sequence one-by-one, and granting access to the access requestor if a total error rate of each of the performed one-by-one actions in the sequence of actions is less than a predefined threshold value.

17 Claims, 5 Drawing Sheets

(56) References Cited

U.S. PATENT DOCUMENTS

| | | | | |
|---|---|---|---|---|
| 2014/0240664 A1* | 8/2014 | Divo | G02C 13/005 | |
| | | | | 351/204 |
| 2015/0017626 A1* | 1/2015 | Basson | G09B 7/08 | |
| | | | | 434/353 |
| 2015/0193664 A1* | 7/2015 | Marti | G08B 21/06 | |
| | | | | 382/103 |
| 2015/0332118 A1* | 11/2015 | Wang | G06F 16/5854 | |
| | | | | 382/203 |
| 2016/0307038 A1* | 10/2016 | Skogo | G06K 9/00604 | |
| 2016/0379047 A1* | 12/2016 | Natan | G06K 9/00281 | |
| | | | | 382/201 |
| 2017/0039473 A1* | 2/2017 | Starrett, Jr. | G06N 3/004 | |
| 2017/0061202 A1* | 3/2017 | Shreve | G06K 9/00315 | |
| 2017/0109513 A1* | 4/2017 | Skogo | G06F 21/32 | |
| 2017/0161951 A1* | 6/2017 | Fix | G06T 5/00 | |
| 2017/0228526 A1* | 8/2017 | Cudak | H04L 63/0861 | |
| 2017/0235934 A1* | 8/2017 | Feng | G06F 21/32 | |
| | | | | 726/19 |
| 2017/0318019 A1* | 11/2017 | Gordon | G06K 9/00617 | |
| 2017/0372056 A1* | 12/2017 | Narasimhan | G06F 21/36 | |
| 2018/0133593 A1* | 5/2018 | Wilson | G06T 15/00 | |
| 2018/0189550 A1* | 7/2018 | McCombe | G06K 9/00288 | |
| 2019/0276036 A1* | 9/2019 | Noguchi | B60W 40/08 | |

\* cited by examiner

SYSTEM, METHOD AND COMPUTER PROGRAM PRODUCT FOR STATEFUL INSTRUCTION-BASED DYNAMIC MAN-MACHINE INTERACTIONS FOR HUMANNESS VALIDATION

BACKGROUND

The present invention relates generally to a humanness validation method, and more particularly, but not by way of limitation, to a system, method, and computer program product for validating whether an attempt to access a service is performed by a human being or a robot, using machine instructions to the human or potential robotic hacker.

Web Captcha is a setting where users are asked to prove, via interactions a security system, that they are human being and not automated robots trying to break into a system. Often, the systems involve humans responding to questions that require artificial intelligence for robots to answer but that require so-called "normal intelligence" for humans. Other techniques have emerged such as the so-called "deep image recognition" technique which requests a user identify a subset of images having a particular feature.

However, the text captchas are conventionally easy to break with an Optical Character Reader (OCR) and there are many commercial services available at inexpensive rates that break such captchas. Also, the deep image recognition is easily manipulated by artificial intelligence for robots to gain access to a system.

SUMMARY

In an exemplary embodiment, the present invention can provide a computer-implemented humanness validation method, the method including generating a sequence of actions including gaze actions and emotional state actions, instructing an access requestor to perform the actions in the sequence one-by-one, and granting access to the access requestor if a total error rate of each of the performed one-by-one actions in the sequence of actions is less than a predefined threshold value.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity.

Figure 1:
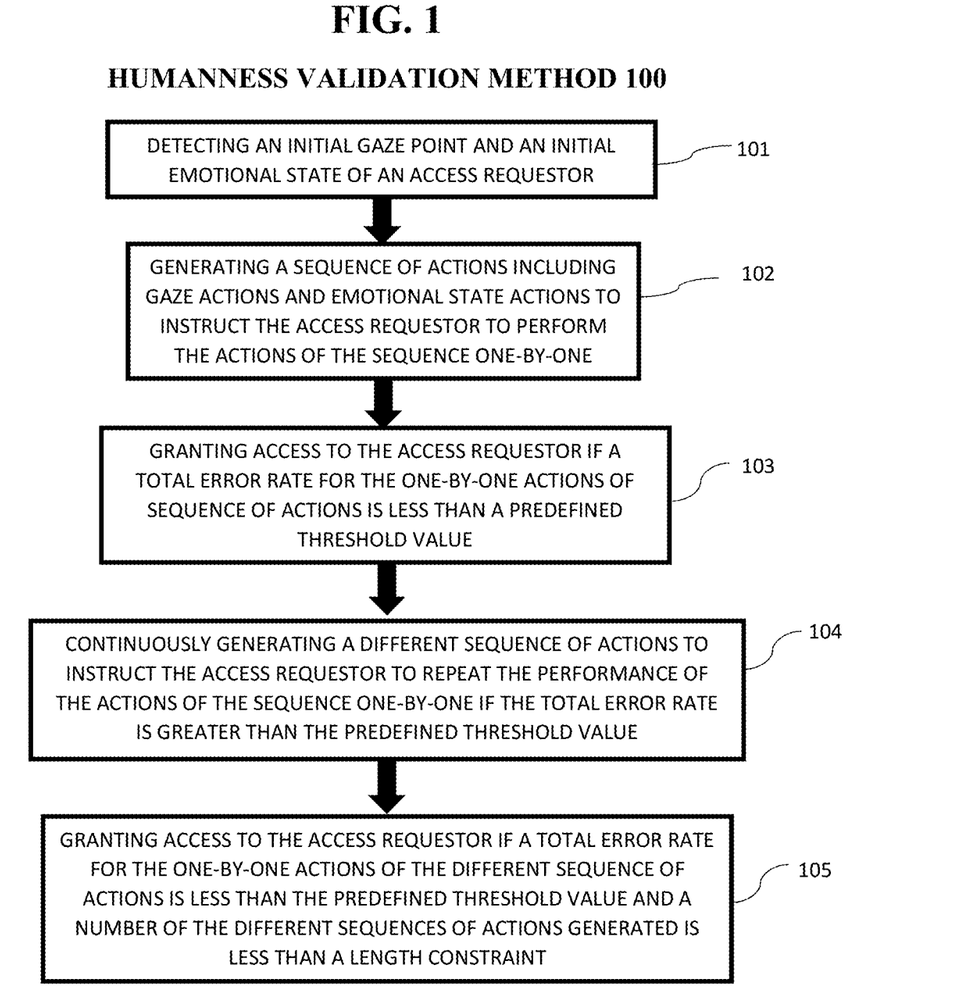
FIG. 1 exemplarily shows a high-level flow chart for a humanness validation method 100 according to an embodiment of the present invention.

By way of introduction of the example depicted in FIG. 1, an embodiment of a humanness validation method 100 according to the present invention can include various steps for providing a combination of interactive human gazes and interactive human emotion sequences (e.g., a multimodal fusion), along with dynamic image point generation and state maintenance, and subsequent approximate matching of the states, that is difficult to circumvent. By way of introduction of the example depicted in FIG. 2, one or more computers of a computer system 12 according to an embodiment of the present invention can include a memory 28 having instructions stored in a storage system to perform the steps of FIG. 1.

Thus, a humanness validation method 100 according to an embodiment of the present invention may act in a more sophisticated, useful and cognitive manner, giving the impression of cognitive mental abilities and processes related to knowledge, attention, memory, judgment and evaluation, reasoning, and advanced computation. In other words, a "cognitive" system can be said to be one that possesses macro-scale properties—perception, goal-oriented behavior, learning/memory and actions generally recognized as cognitive.

Although one or more embodiments may be implemented in a cloud environment 50 (see e.g., FIG. 3), it is nonetheless understood that the present invention can be implemented outside of the cloud environment.

In the description herein the "access requestor" includes either a human or a robot attempting to access (login to) a system and is used interchangeably with a "user".

It is noted that "humanness" means a likelihood that the user attempting to access the system is a human and not a robot.

Referring now to FIG. 1, in step 101, an initial gaze point and an initial emotional state of an access requestor are detected. The initial gaze point and the initial emotional state of the access requestor are detected such that a change in the gaze point and the emotional state can be determined a part of a sequence of actions (as described later).

In step 102, a sequence of actions are generated and the access requestor is instructed to perform the actions of the generated sequence one-by-one. The sequence of actions includes, for example, gaze actions and emotional state actions. It is preferred that the sequence of actions includes different emotional state actions and eye gaze actions than the initially detected gaze point and emotional state (e.g., the actions do not include a "smile" if the initial emotional state of the access requestor is that the user is "smiling"). A database can include a plurality of actions that the sequence of actions can be generated therefrom.

Gaze actions can include, for example, a reference point on a screen for the user to move their gaze from the initial gaze point to the reference point, a tracking of a type of movement of the user's eyes through simulations on a screen (e.g., simulating an event to track a type of user eye movement such as saccades, smooth pursuit movements, vergence movements, and vestibulo-ocular movements), etc. For example, the instruction on the system can instruct the user to "Look a bit higher upwards", "Look towards the red dot flashing on the screen", "Follow the moving dot" (e.g., to track a type of eye movement), etc.

Emotional state actions can include, for example, a textual (or audio) instruction by the system for the user to express an emotional state on their face such as happiness (smile), sadness (frown), fear (shock facial expression), etc. Alternatively, the emotional state can include a type of facial express such as "blowing out the user's cheeks", holding their nose, raising their eyebrows, etc. For example, the instruction from the system can instruct the user to "Smile after you look a bit higher upwards", "Blow your cheek up once you look at the red flashing dot", etc.

Each action in the sequence of actions is instructed to the user one-by-one. For example, four individual actions can be generated as the sequence of actions and the user is instructed to perform each of the four actions one-by-one such that each performance of an action by the user can be compared with a threshold value (as described later). That is, once the user performs the action, an error value for each of the actions is generated, as the deviation of the actual action from the intended action. After the user performs one of the actions, the next action in the sequence of actions is distributed to the user.

In some embodiments, the sequence of actions can include only emotional state actions or only gaze actions. Thereby, systems having different capabilities can perform the method 100 (e.g., a system without facial recognition technology installed can utilize the method 100 using only eye gaze tracking technology or vice versa).

Further, and although the sequence of actions can include a single action for the user to perform (e.g., one gaze action or one emotional state action), in a preferred embodiment, the sequence of actions includes at least two actions to instruct the user to perform the actions one-by-one. It is noted that the number of actions in the sequence of actions can be set by a system manager and increased (or decreased) based on the security requirements of the system.

In step 103, access to the access requester is granted if a total error rate for the one-by-one actions of the sequence of actions is less than a predefined threshold value. That is, if a gaze point is denoted by G, an emotion by E, and an action by A, then an action sequence is defined as the regular expression $\{A\}=(G|E)$ with a maximum number of actions M (e.g., two actions, three actions, etc.). A success function $S(A)$ is computed for action A, and $S(A)$=true if the instructed gaze point is gazed at by the access requestor if a gaze point instruction is given (e.g., a gaze action instruction), or the instructed emotional state is demonstrated by the access requestor if an emotion instruction is given (e.g., an emotional state action instruction). It is noted that the "true" result can also include a confidence value that the action as performed indicating an error in the performance of the action.

For example, if the instructed action is "gaze to the top of the screen" and the user gazes upward and left, confidence value can be, for example, 0.95 indicating that it is 95% confident that the access requestor successfully performed the action. Thus, the total error rate is a summation of each of the confidence values of a successful action for each of the sequence of actions. If the total error rate is less than the predefined threshold value (e.g., a value indicating a particular success rate for each of the actions required to access the system), access is granted. As another example, if the sequence of actions includes three actions and the access requestor performs each action with a 90% confidence rate, the total error rate is 0.1 (10%) and access is granted if the acceptable error tolerance for the system is greater than 0.1.

It is noted that the error rate can not only be a function of an accuracy of performing the action but also a function of time taken to perform the action. For example, if the action is a gaze action and the user takes several seconds to perform the gaze, the error rate can factor in this delay.

In other words, a sequence of comprising an arbitrary sequence of gaze points and emotional expressions are instructed to the access requestor one-by-one for them to follow, the access requestor follows them, and for each A, a reward value $R(A)$ is computed, where in an embodiment, $R(A)=w$ (w>0) if the success $S(A)$=TRUE for the action, and $R(A)=0$ if $S(A)$=FALSE.

In step 104, a different sequence of actions is continuously generated to instruct the access requestor to repeat the performance of the actions of the sequence one-by-one if the total error rate is greater than the predefined threshold. In other words, if the access requestor makes too many errors when performing the sequence, a new sequence is generated for the access requestor to attempt. The sequences are continuously generated up to a system defined length constraint L. The length constraint represents a maximum number of sequences that the access requestor is allowed to attempt before a successful attempt and still obtain access to the system (e.g., if the length constraint is 3, step 104 can generate two additional sequences of actions for the user to attempt).

In step 105, access to the access requestor is granted if a total error rate for the one-by-one actions for any of the different sequence of actions is less than a predefined threshold value and a number of the different sequences of actions generated is less than the length constraint. In other words, if within the length constraint L, the total of sum(R(A)) for any of the sequences of actions is less than a predefined threshold, the access request if treated as a success, and access is granted to the access requestor. For example, if the length constraint is four, and the total error rate on a third different sequence of actions generated is less than the predefined threshold value, access is granted. However, if the access requestor does not complete with the sequence of actions with a total error rate less than the predefined threshold value until after the fourth attempt, access is denied.

Therefore, steps 101-105 can generate an error value once the user performs an action of the sequence as the deviation of the actual action from the intended action. Then, the screen of the device would flash the next action to the user at the zone around the point of gaze on the screen (or, if the user has been instructed to look outside the screen, then at the last known point of the departure of the gaze from the screen, or in form of other instruction modalities such as audio). The next action will be one of gaze and emotion, but preferably not both. Also, while the instruction is independent of the previous instruction, the "location of the screen"

where the next action is shown to the user for taking will be at the user's gaze point. While the user performs the action, as long the error does not cross a predefined (or, learned-over-time) threshold, the user gets to repeat the set of actions (gaze-and/or-emotion) for a finite number of times, up until the maximum permissible length constraint. If the error never crosses a threshold when the error measurement is matched over any arbitrarily generated subsequence of the longer temporal sequence, or the summed weight crosses a success threshold, the user is allowed to access the system (detected to be a real human being). In the alternative, the user is not allowed to access the system (e.g., detected as possibly a robot).

In some embodiments, in step 101, a depth distance from the gaze point (e.g., a position of a camera on the device) to at least two points on the access requesters face are detected to confirm that an actual human is attempting to access the system. That is, hackers have used an artificially intelligent avatar on a device to simulate human eye gaze and emotion. The avatar is displayed facing the system and attempts to gain access by performing the sequence of actions generated in step 102. However, the avatar is displayed on a two-dimensional screen and the depth distance from, for example, a nose of the avatar and a cheekbone of the avatar are the same. Therefore, a depth distance can be detected between a gaze point and two points having different depth distances to the gaze point on a human face to verify that a human is attempting to perform the sequence of actions and not an avatar.

In an exemplary embodiment, a user is looking at the top of their laptop's web browser, when they type a web address that they want to log into, and is looking serious and focused. The user's current expression and gaze point are detected (e.g., step 101). Then, a message flashes at the top of the screen, in the zone he is looking at, to smile and then look at the left bottom where he sees a red dot flashing. The user smiles and looks at the left bottom towards the flashing red dot. A message pops up replacing the red dot, instructing the user to frown and look at the middle height of the right side of the screen, towards a blue flashing button (and flashes multiple buttons, each with a distinct color, at different parts of the screen). The user successfully performs the action. Then, the blue flashing button is replaced by another instruction, this time to look at the square shape and avoid all the other shapes, that appear towards the left top of the screen, and then (or at the same time) either blow his cheeks up or wink with his left eye. The user also does this successfully (e.g., one-by-one performing the actions of the sequence of actions (step 102)). The user's gaze and emotional patterns are done correctly, and the error margins of the emotions and gaze points are within permissible margins, so the user is determined as a human being and not a robot. Thus, the user is allowed to log into the system (e.g., step 103).

Figure 2:
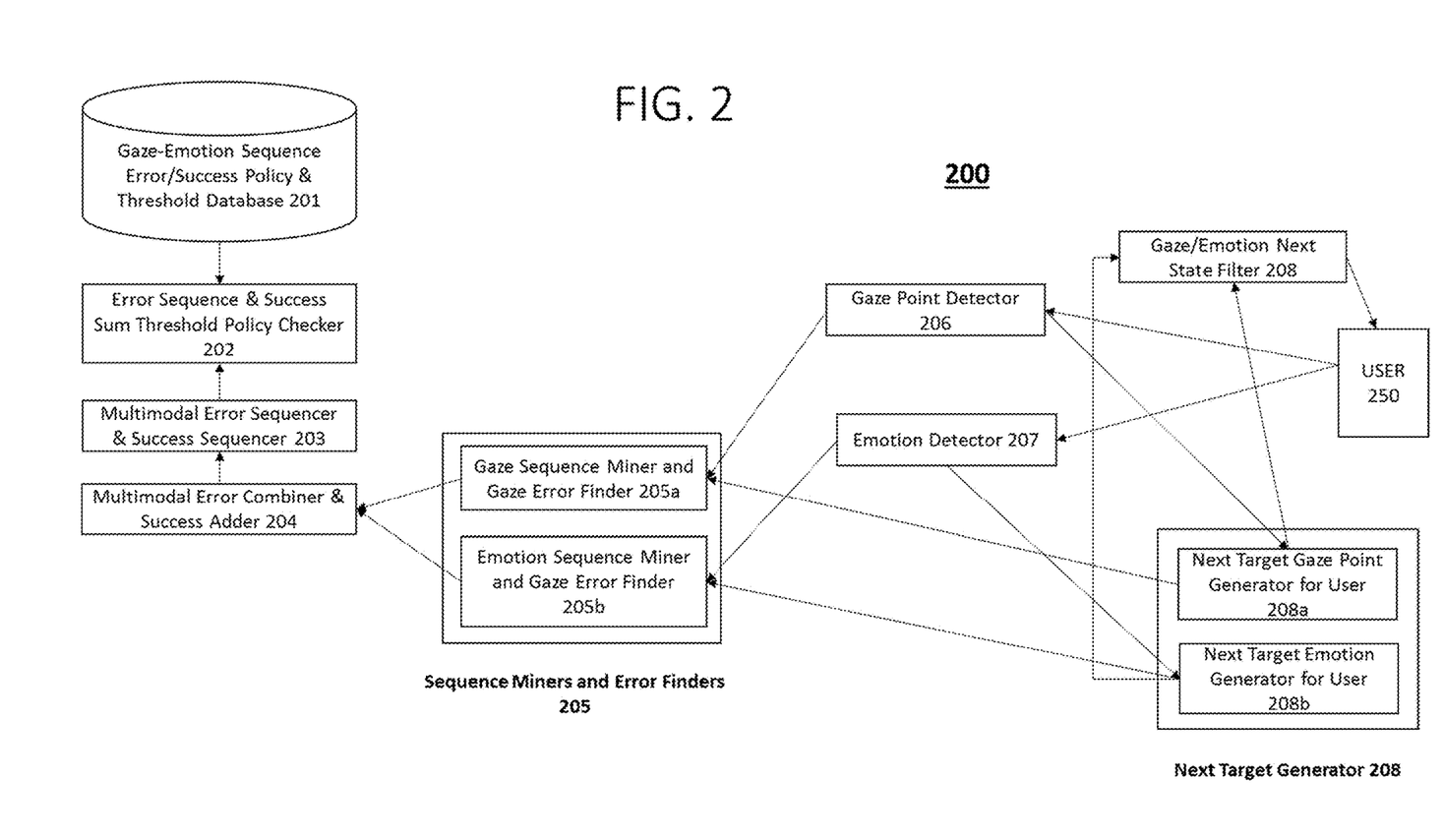
FIG. 2 exemplarily depicts an exemplary system 200 diagram according to an embodiment of the present invention.

FIG. 2 exemplarily depicts an architecture of a system 200. The gaze point detector 206 detects an initial gaze point (and subsequent gaze points) of the user and the emotion detector 207 detects an initial emotional state (and subsequent emotional states) of the user (e.g., such as a camera on a device or third-party cameras near a device). The next target generator 208 includes a next target gaze point generator for the user 208a that generates gaze action for a sequence of actions and the next target emotion generator for the user 208b generates emotional state actions for the sequence of actions. The gaze/emotion next state filter 208 creates the sequence of actions and instructs the user to perform the actions one-by-one in the sequence. The sequence miners and error finders 205 include a gaze sequence miner and gaze error finder 205a and an emotion sequence miner and gaze error finder 205b detects an error rate for each of the actions in the sequence of actions when the user performs the action. The multimodal error combiner and success adder 204 sums the error rates for all of the actions in the sequence of action and the multimodal error sequence and success sequencer 203 verifies that the length constraint for the sequence is met. The error sequence and success sum threshold policy check 202 checks the database 201 to determine if the total error rate for the actions performed by the user is less than a predefined threshold of the database 201 for the particular system. Then, access is given or denied based on the error rate check by the error sequence and success sum threshold policy checker 202.

It is noted that the method 100 and the system 200 can interface with (e.g., be enabled by using the new steps 101-105 in conjunction with) standard web catch services, eye gaze point detection modules, emotion detection modules, and a digital portal such as a web or mobile application on which a user can interact with.

Thereby, the method 100 and system 200 can provide a stateful multimodal technique that interacts with a sequence of human interactions, in form of dynamically generated instructions regarding eye gaze and emotional expressions, where the system detects the current eye gaze and emotion state of the user, generates a sequence of eye gaze and emotion state that the user needs to show to authenticate, where a next state is defined as a change of exactly any one of eye gaze or emotion state, and is independent of the type of the previous state's change (gaze or emotion), and validate the action taken by a user within a finite period of time by matching the sequence within a permissible threshold on an ongoing and/or post-facto basis, for authenticating a human being (differentiating from robots).

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
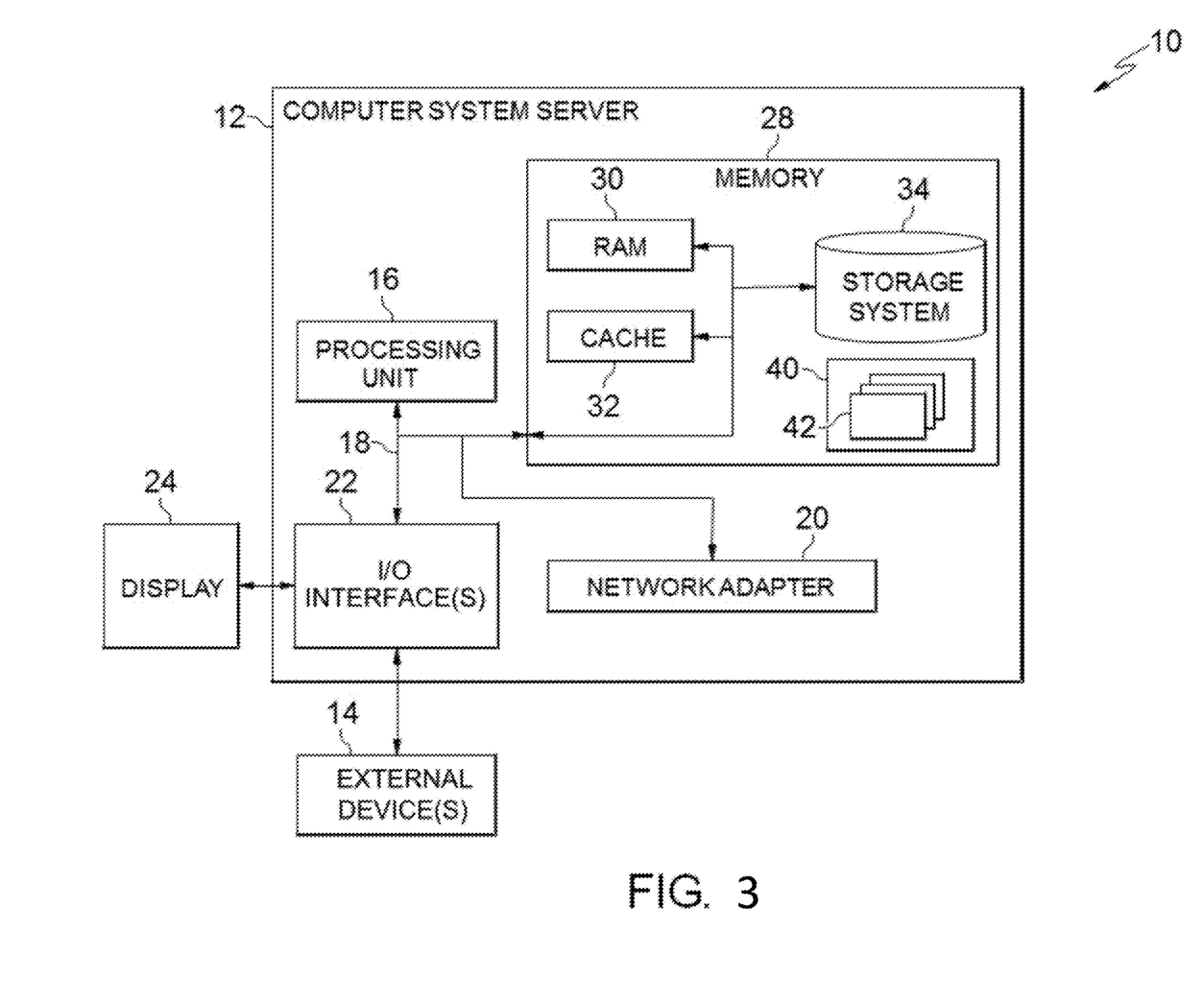
FIG. 3 depicts a cloud-computing node 10 according to an embodiment of the present invention.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 3, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
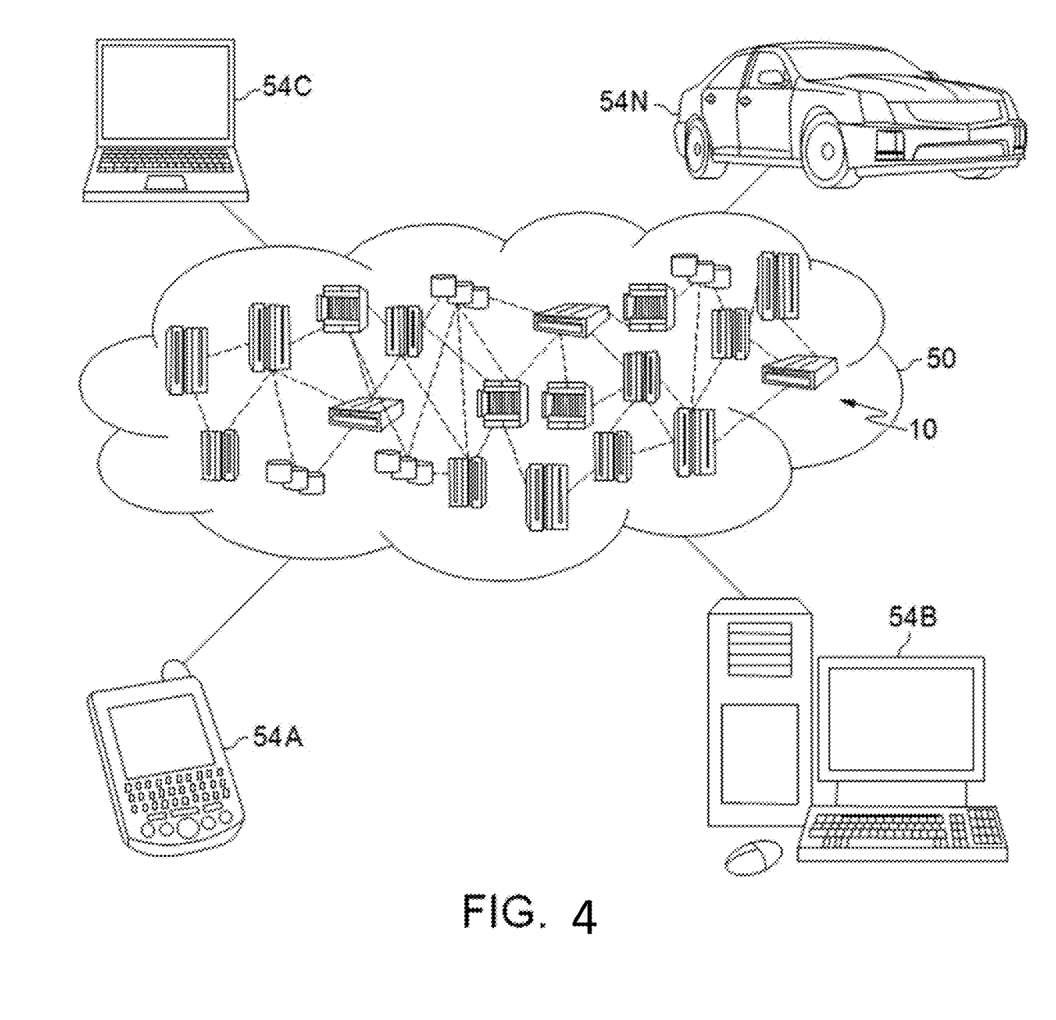
FIG. 4 depicts a cloud-computing environment 50 according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
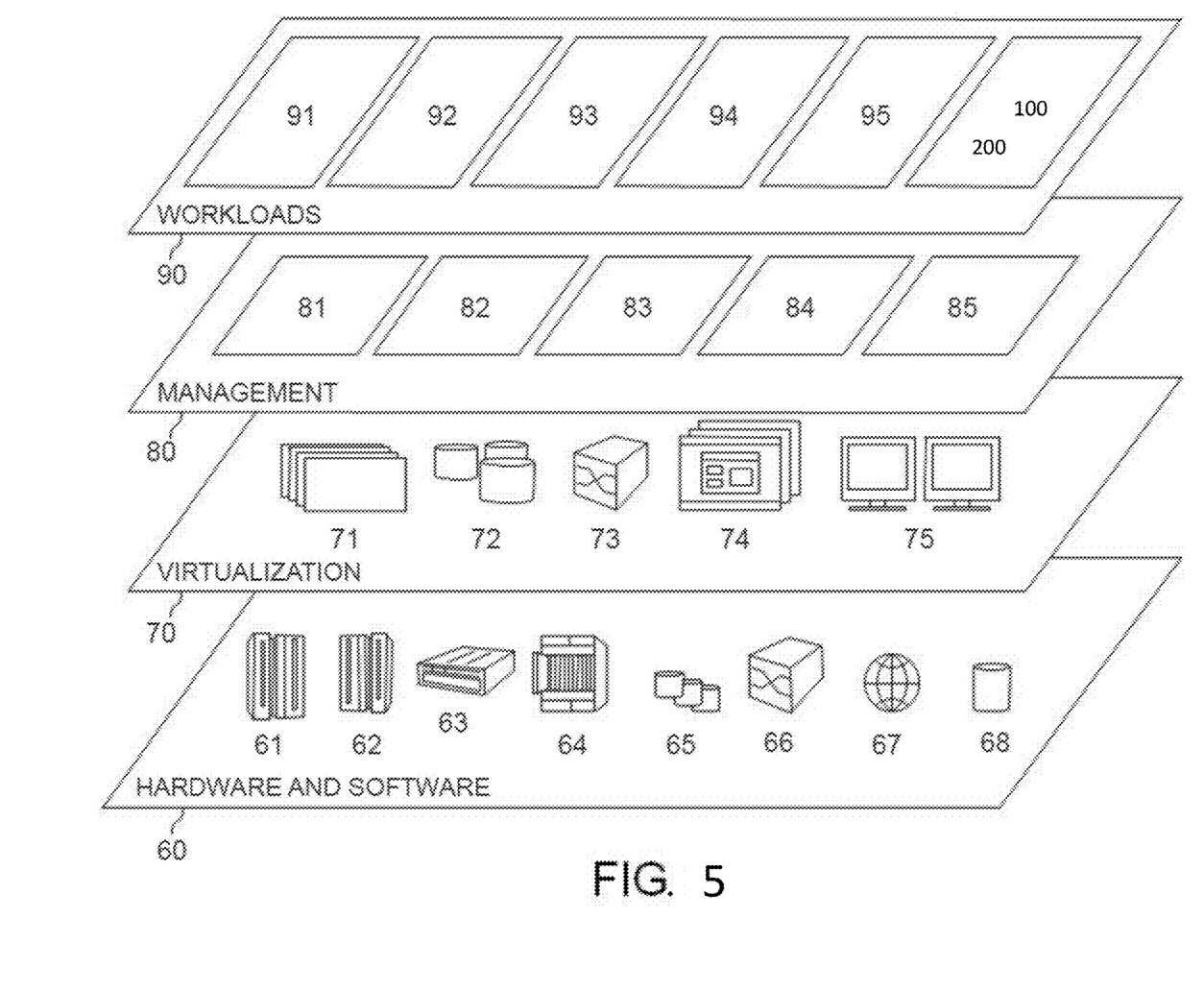
FIG. 5 depicts abstraction model layers according to an embodiment of the present invention.

Referring now to FIG. 5, an exemplary set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and humanness validation method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented humanness validation method, the method comprising:
generating a sequence of actions including a combination of gaze actions and emotional state actions including a facial expression and a facial action as a primary input modality;
instructing an access requestor to perform the actions in the sequence one-by-one; and granting access to the access requestor if a total error rate in each of the performed one-by-one actions in the sequence of actions is less than a predefined threshold value,
wherein the gaze actions and the emotional state actions include changing a current gaze action and a current emotional state action to the sequence of actions including a combination of gaze actions and emotional state actions as a result of receiving the instructing to perform the actions,
further comprising detecting an initial gaze point and an initial emotional state of the access requestor prior to generating the sequence of actions,
wherein a first depth distance is calculated between a fixed point on a device and a first point on the access requestor,
wherein a second depth distance is calculated between the fixed point on the device and a second point on the access requestor, and
wherein access is denied to the access requestor if the first depth distance is within a predetermined amount of the second depth distance.

2. The computer-implemented method of claim 1, further comprising continuously generating a different sequence of actions to instruct the access requestor to repeat the performance of the actions in the different sequence one-by-one if the total error rate is greater than the predefined threshold value.

3. The computer-implemented method of claim 2, wherein the granting grants access to the access requestor if the total error rate for each of the performed one-by-one actions in the different sequence of actions is less than the predefined threshold value and a number of the different sequences of actions generated is less than a length constraint.

4. The computer-implemented method of claim 1, wherein the generated sequence of actions includes a gaze action different than the initial gaze point of the access requestor and an emotional state action different than the initial emotional state of the access requestor.

5. The computer-implemented method of claim 1, wherein the instructing instructs a next action in the sequence of actions to the access requestor after an error rate in a previous action is determined.

6. The computer-implemented method of claim 1, wherein the instructing instructs each action independently of other actions such that the access requestor performs the actions in the one-by-one sequence to determine an error rate associated with each action, the total error rate being a summation of the error rate associated with each action.

7. The computer-implemented method of claim 1, wherein the detecting the initial gaze point and the initial emotional state of the access requestor is prior to generating the sequence of actions,
wherein a first depth distance is calculated between a fixed point on a device and a first point on the access requestor,
wherein a second depth distance is calculated between the fixed point on the device and a second point on the access requestor, and
wherein access is denied to the access requestor if the first depth distance is within a predetermined amount of the second depth distance.

8. The computer-implemented method of claim 1, embodied in a cloud-computing environment.

9. A computer program product for humanness validation, the computer program product comprising a non-transitory computer readable storage medium having program instructions embodied therewith, the program instructions executable by a computer to cause the computer to perform:
generating a sequence of actions including a combination of gaze actions and emotional state actions including a facial expression and a facial action as a primary input modality;
instructing an access requestor to perform the actions in the sequence one-by-one; and
granting access to the access requestor if a total error rate of each of the performed one-by-one actions in the sequence of actions is less than a predefined threshold value,
wherein the gaze actions and the emotional state actions include changing a current gaze action and a current emotional state action to the sequence of actions including a combination of gaze actions and emotional state actions as a result of receiving the instructing to perform the actions,
further comprising detecting an initial gaze point and an initial emotional state of the access requestor, wherein a first depth distance is calculated between a fixed point on a device and a first point on the access requestor,
wherein a second depth distance is calculated between the fixed point on the device and a second point on the access requestor, and
wherein access is denied to the access requestor if the first depth distance is within a predetermined amount of the second depth distance.

10. The computer program product of claim 9, further comprising continuously generating a different sequence of actions to instruct the access requestor to repeat the performance of the actions in the different sequence one-by-one if the total error rate is greater than the predefined threshold value.

11. The computer program product of claim 10, wherein the granting grants access to the access requestor if the total error rate for each of the performed one-by-one actions in the different sequence of actions is less than the predefined threshold value and a number of the different sequences of actions generated is less than a length constraint.

12. The computer program product of claim 9, wherein the generated sequence of actions includes a gaze action different than the initial gaze point of the access requestor and an emotional state action different than the initial emotional state of the access requestor.

13. The computer program product of claim 9, wherein the instructing instructs a next action in the sequence of actions to the access requestor after an error rate in a previous action is determined.

14. The computer program product of claim 9, wherein the instructing instructs each action independently of other actions such that the access requestor performs the actions in the one-by-one sequence to determine an error rate associated with each action, the total error rate being a summation of the error rate associated with each action.

15. The computer program product of claim 9, wherein the detecting the initial gaze point and the initial emotional state of the access requestor is prior to generating the sequence of actions,
wherein a first depth distance is calculated between a fixed point on a device and a first point on the access requestor,
wherein a second depth distance is calculated between the fixed point on the device and a second point on the access requestor, and wherein access is denied to the access requestor if the first depth distance is within a predetermined amount of the second depth distance.

16. A humanness validation system, said system comprising:
a processor; and
a memory, the memory storing instructions to cause the processor to perform:
generating a sequence of actions including a combination of gaze actions and emotional state actions including a facial expression and a facial action as a primary input modality;
instructing an access requestor to perform the actions in the sequence one-by-one; and
granting access to the access requestor if a total error rate of each of the performed one-by-one actions in the sequence of actions is less than a predefined threshold value,
wherein the gaze actions and the emotional state actions include changing a current gaze action and a current emotional state action to the sequence of actions including a combination of gaze actions and emotional state actions as a result of receiving the instructing to perform the actions,
further comprising detecting an initial gaze point and an initial emotional state of the access requestor,
wherein a first depth distance is calculated between a fixed point on a device and a first point on the access requestor,
wherein a second depth distance is calculated between the fixed point on the device and a second point on the access requestor, and
wherein access is denied to the access requestor if the first depth distance is within a predetermined amount of the second depth distance.

17. The system of claim 16, embodied in a cloud-computing environment.

* * * * *